United States Patent
Kim et al.

(10) Patent No.: US 9,404,661 B2
(45) Date of Patent: Aug. 2, 2016

(54) ELECTRIC OVEN AND METHOD FOR SERVICING SAME

(75) Inventors: Hagsoo Kim, Changwon-si (KR); Jaekyung Yang, Changwon-si (KR); Jaehyoun Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 13/993,382

(22) PCT Filed: Feb. 11, 2011

(86) PCT No.: PCT/KR2011/000933
§ 371 (c)(1),
(2), (4) Date: Aug. 27, 2013

(87) PCT Pub. No.: WO2012/108569
PCT Pub. Date: Aug. 16, 2012

(65) Prior Publication Data
US 2013/0334197 A1    Dec. 19, 2013

(51) Int. Cl.
*A21B 1/22* (2006.01)
*F24C 7/04* (2006.01)
*F24C 7/06* (2006.01)
*F24C 15/00* (2006.01)
*F24C 15/08* (2006.01)
*B23P 19/00* (2006.01)

(52) U.S. Cl.
CPC ............... *F24C 7/043* (2013.01); *B23P 19/00* (2013.01); *F24C 7/046* (2013.01); *F24C 7/067* (2013.01); *F24C 15/007* (2013.01); *F24C 15/08* (2013.01); *F24C 7/065* (2013.01); *Y10T 29/49815* (2015.01)

(58) Field of Classification Search
CPC ...... F24C 15/327; F24C 15/22; F24C 15/007; F24C 15/08; F24C 7/043; F24C 7/046; F24C 7/06; F24C 7/062; F24C 7/065; F24C 7/067; F24C 7/08; F24C 7/081; F24C 7/082; A47J 27/04; A47J 27/62; A47J 27/002; Y10T 29/49815; B23P 19/00
See application file for complete search history.

(56) References Cited

FOREIGN PATENT DOCUMENTS

| JP | H 08-270958 A | 10/1996 |
|---|---|---|
| KR | 10-0437421 B1 | 6/2004 |
| KR | 10-0556504 B1 | 3/2006 |

(Continued)

OTHER PUBLICATIONS

International Search Report issued in PCT Application No. PCT/KR2011/000933 dated Nov. 9, 2011.

(Continued)

*Primary Examiner* — Shawntina Fuqua
(74) *Attorney, Agent, or Firm* — KED & Associates, LLP (57) ABSTRACT

Provided is an electric oven, which includes a main body, a cooktop, and an oven part. The cooktop is disposed in an upper portion of the main body to heat an object. The oven part is disposed within the main body under the cooktop, and includes a cavity including a cooking chamber, a door selectively opening and closing the cooking chamber, and a first heating unit and a second heating unit, which supply radiant energy into the cooking chamber. Before the cooktop is installed, or after the cooktop is removed, a top of the main body is opened, and the first heating unit is installed in or removed from the cavity through the opened top of the main body. The second heating unit is installed in or removed from the cooking chamber through an open front of the cooking chamber. Accordingly, a heater can be protected, and be conveniently installed and removed.

20 Claims, 11 Drawing Sheets

(56) References Cited

FOREIGN PATENT DOCUMENTS

| KR | 10-2008-0095551 |   | 10/2008 |
|----|-----------------|---|---------|
| KR | 20-2009-0003023 |   | 3/2009  |
| KR | 10-2009-0071266 | A | 7/2009  |
| KR | 10-2010-0049785 |   | 5/2010  |
| KR | 10-2011-0089777 |   | 8/2011  |
| KR | 1020110089777   | * | 8/2011  |

OTHER PUBLICATIONS

Korean Office Action issued in Application No. 10-2010-0009321 dated Feb. 29, 2016.

* cited by examiner

ELECTRIC OVEN AND METHOD FOR SERVICING SAME

CROSS-REFERENCE TO RELATED PATENT APPLICATIONS

This application is a U.S. National Stage Application under 35 U.S.C. §371 of PCT Application No. PCT/KR2011/000933, filed Feb. 11, 2011.

BACKGROUND

The present disclosure relates to an electric oven and a method of servicing the electric oven.

Electric ovens are cooking appliances that use electricity to cook food. Such electric ovens include various types of heaters as heating sources for cooking food in a cooking chamber. Such a heater is covered with a reflector for reflecting radiant energy from the heater into the cooking chamber, or a heater cover for preventing radiant energy from being emitted from the heater to the outside.

However, electric ovens including heaters have the following limitations.

When a typical heater is installed in or removed from an electric oven through a cooking chamber. The heater is installed in or removed from the electric oven, independently from other members, for example, a member for supporting the heater. Thus, when being installed in or removed from the electric oven, the heater may be damaged.

In addition, a process of installing and removing the heater is performed within the cooking chamber. Thus, the process is inefficiently performed.

SUMMARY

Embodiments provide an electric oven and a method of servicing the electric oven, which protects a heater during a heater installing or removing process.

Embodiments also provide an electric oven and a method of servicing the electric oven, which makes it possible to perform a heater installing and removing process more efficiently.

In one embodiment, an electric oven includes: a main body; a cooktop disposed in an upper portion of the main body to heat an object; and an oven part disposed within the main body under the cooktop, and including a cavity including a cooking chamber, a door selectively opening and closing the cooking chamber, and a first heating unit and a second heating unit, which supply radiant energy into the cooking chamber, wherein before the cooktop is installed, or after the cooktop is removed, a top of the main body is opened, and the first heating unit is installed in or removed from the cavity through the opened top of the main body, and the second heating unit is installed in or removed from the cooking chamber through an open front of the cooking chamber.

In another embodiment, a method of servicing an electric oven including a main body, a cooktop disposed in an upper portion of the main body to heat an object, a cavity disposed within the main body under the cooktop, and a heating unit fixed to the cavity, includes: removing the cooktop from the main body; and removing the heating unit from the cavity through an opened top of the main body, wherein the top of the main body is opened by removing the cooktop.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to embodiments of the present disclosure, examples of which are illustrated in the accompanying drawings.

Figure 1:
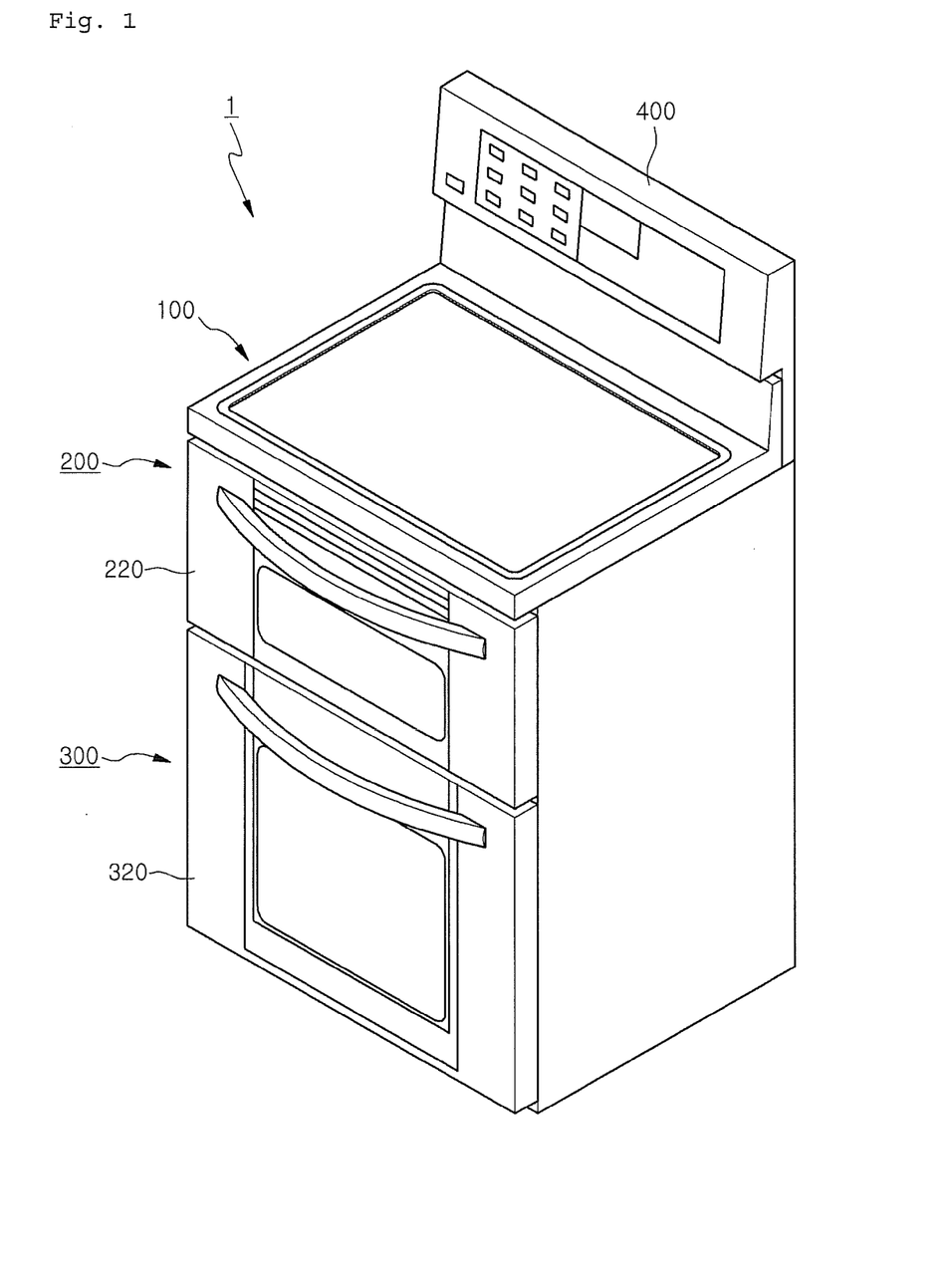
FIG. 1 is a perspective view illustrating an electric oven according to an embodiment.
Figure 2:
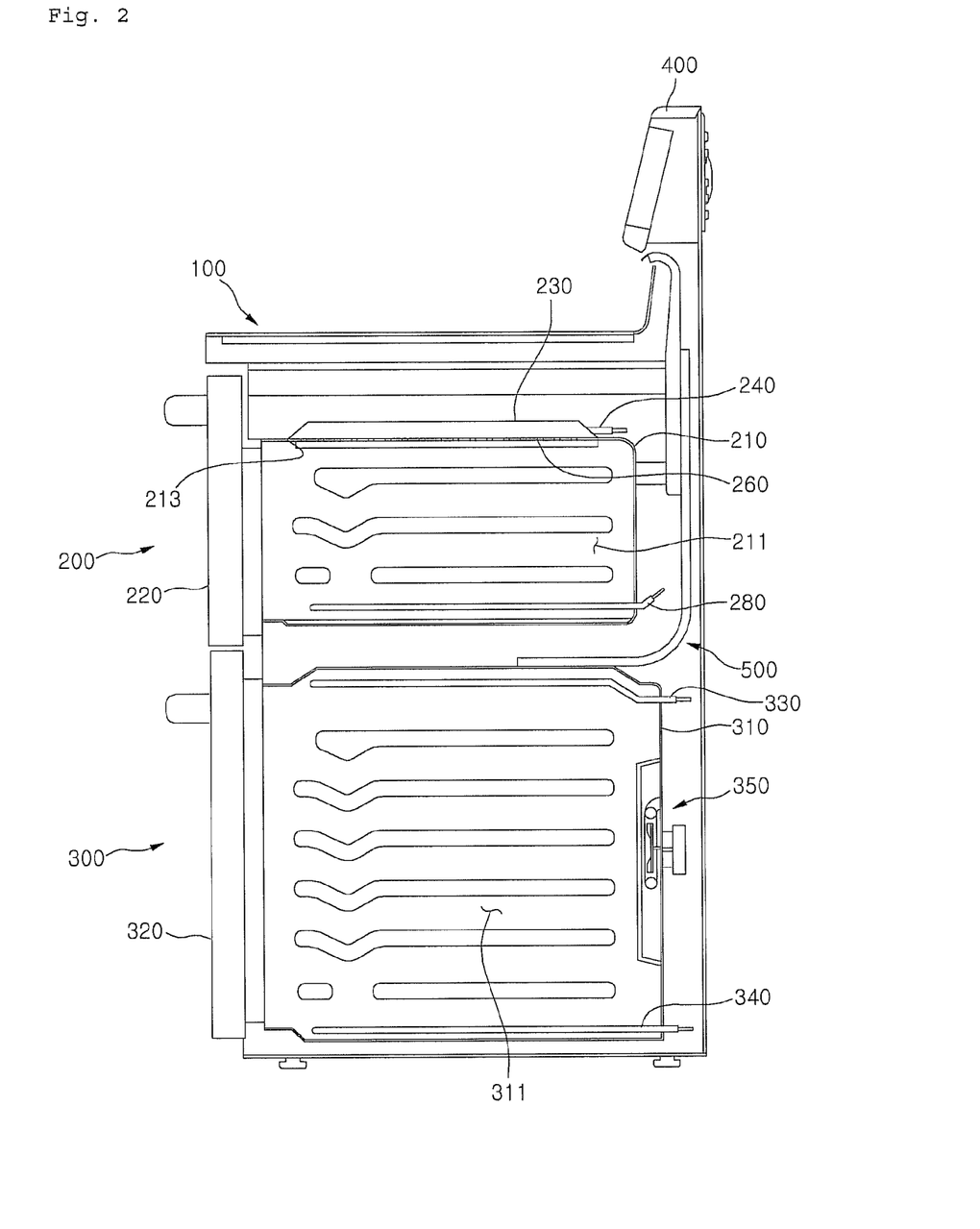
FIG. 2 is a vertical cross-sectional view illustrating the electric oven of FIG. 1.
Figure 3:
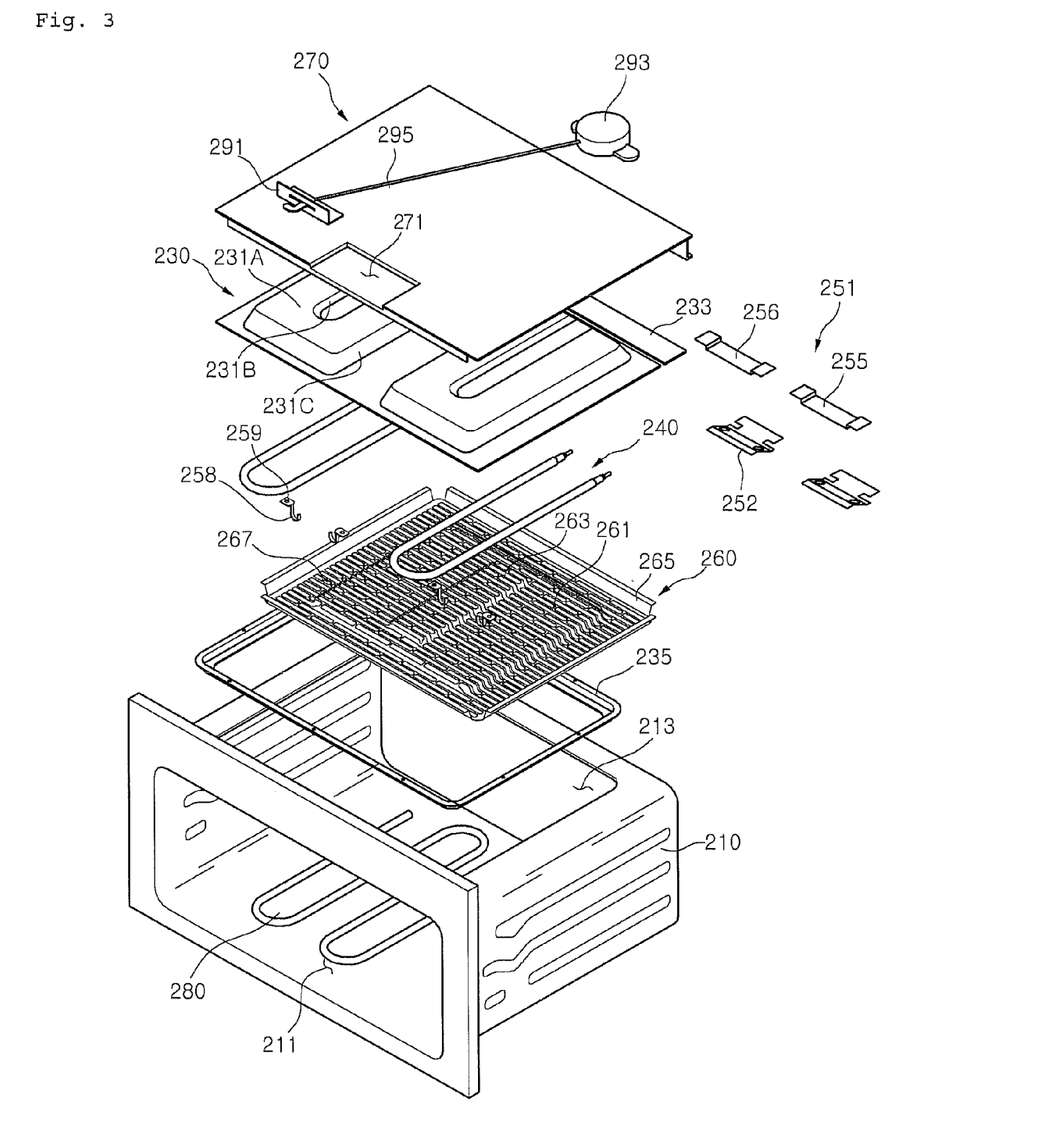
FIG. 3 is an exploded perspective view illustrating a principal part of the electric oven of FIG. 1.
Figure 4:
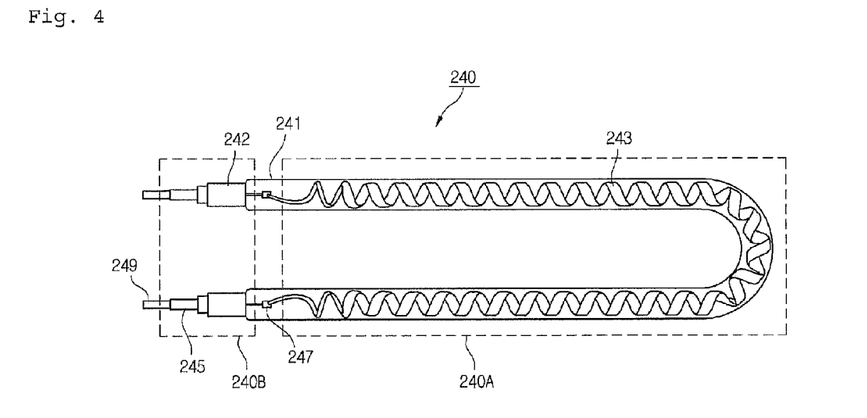
FIG. 4 is a plan view illustrating a carbon heater constituting the electric oven of FIG. 1.
Figure 5:
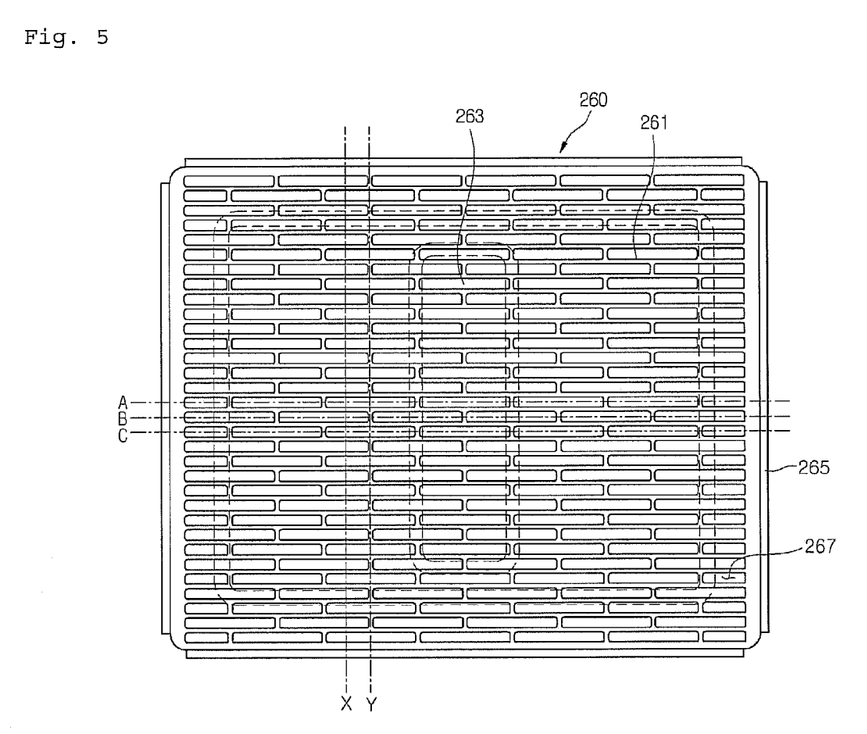
FIG. 5 is a plan view illustrating a grate constituting the electric oven of FIG. 1.
Figure 6:
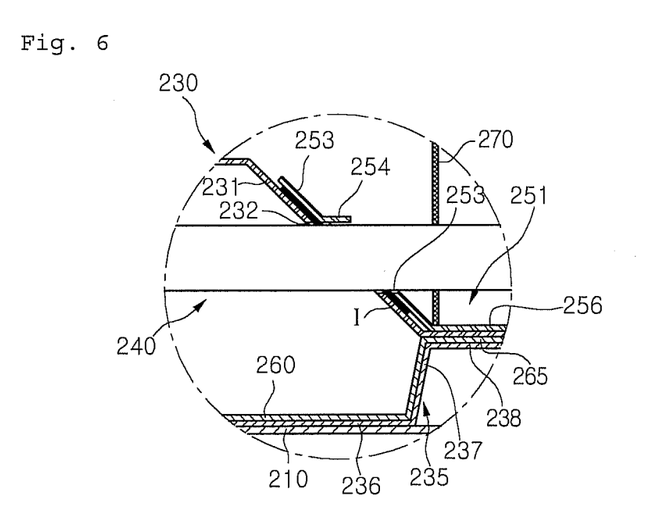
FIG. 6 is a vertical cross-sectional view illustrating a principal part of the electric oven of FIG. 1.
Figure 7:
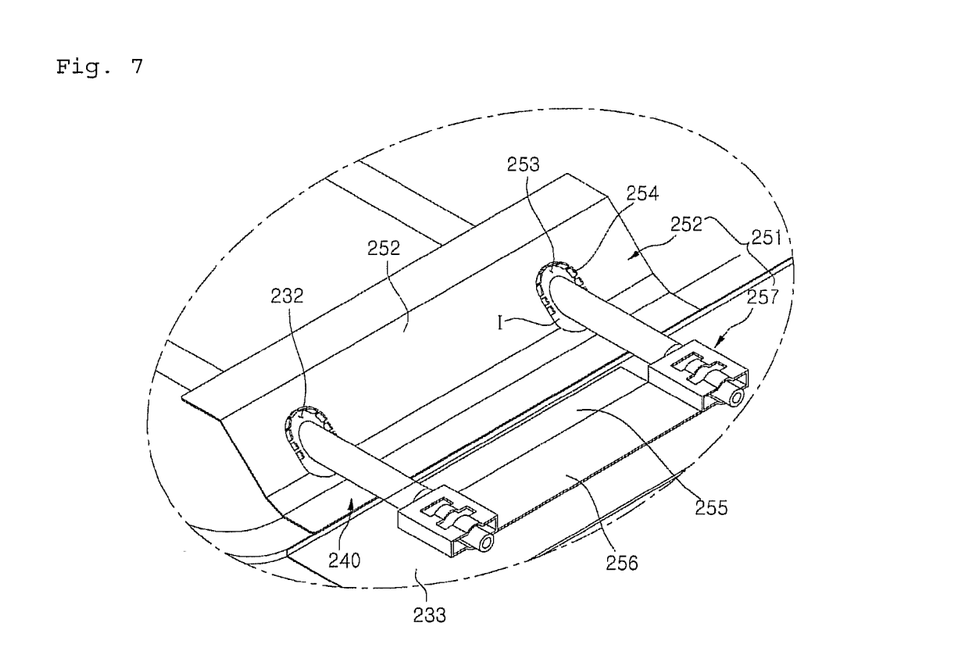
FIG. 7 is a perspective view illustrating a principal part of the electric oven of FIG. 1.

FIG. 1 is a perspective view illustrating an electric oven according to an embodiment. FIG. 2 is a vertical cross-sectional view illustrating the electric oven of FIG. 1. FIG. 3 is an exploded perspective view illustrating a principal part of the electric oven of FIG. 1. FIG. 4 is a plan view illustrating a carbon heater constituting the electric oven of FIG. 1. FIG. 5 is a plan view illustrating a grate constituting the electric oven of FIG. 1. FIG. 6 is a vertical cross-sectional view illustrating a principal part of the electric oven of FIG. 1. FIG. 7 is a perspective view illustrating a principal part of the electric oven of FIG. 1.

Referring to FIGS. 1 and 2, a cooktop 100 is disposed in the upper portion of a main body 1 of an electric oven. Cooktop heaters (not shown) are disposed within the cooktop 100. Food is cooked using the cooktop heaters of the cooktop 100.

A first oven part 200 and a second oven part 300 are disposed within the main body 1 under the cooktop 100. The first and second oven parts 200 and 300 independently perform a cooking process. The first and second oven parts 200 and 300 are vertically stacked. The first oven part 200 is smaller than the second oven part 300. The first and second oven parts 200 and 300 will be described later in more detail.

A control panel 400 is disposed in the upper rear end of the main body 1 behind the cooktop 100. The control panel 400 receives a signal for an operation of the first and second oven parts 200 and 300, particularly, a cooking operation of the cooktop 100 and the first and second oven parts 200 and 300, and outputs information about the cooking operation. Alternatively, a separate cooktop control panel may be provided to receive a signal for an operation of the cooktop 100, and output information about the operation.

Referring to FIGS. 2 and 3, the first oven part 200 includes a first cavity 210 and a first door 220. A first cooking chamber 211 is disposed within the first cavity 210. Food is cooked in the first cooking chamber 211. A communication opening 213 is disposed in the top surface of the first cavity 210. The communication opening 213 is formed by partially cutting the top surface of the first cavity 210. For example, the upper end of the first door 220 may be vertically rotated about the lower end thereof using a pull down method, so as to selectively open and close the first cooking chamber 211.

A reflector 230 is disposed on the top surface of the first cavity 210. The reflector 230 reflects radiant energy to the inside of the first cooking chamber 211 from carbon heaters 240 to be described later. A certain space separated from the first cooking chamber 211 is disposed within the reflector 230. Substantially, the reflector 230 covers the communication opening 213. Thus, the reflector 230 may be referred to as a cover member for covering the communication opening 213. An inner space of the reflector 230 communicates with the first cooking chamber 211 through the communication opening 213.

The reflector 230 includes heater placement parts 231. The number of the heater placement parts 231 may be two. The heater placement parts 231 have a shape corresponding to the shape of the carbon heater 240. For example, the heater placement part 231 may be formed by protruding a portion of the reflector 230 in a direction away from the first cooking chamber 211. Accordingly, the heater placement part 231 has a polyhedral shape with an open bottom. In this case, the heater placement part 231 has an approximately trapezoidal vertical cross-section. Thus, the heater placement part 231 has a horizontal cross section with a size varied according to distances from the reflector 230, and the horizontal cross section corresponds to the shape of the carbon heater 240. For example, horizontal cross sections of the heater placement part 231 may decrease in size in a direction away from the reflector 230.

The heater placement part 231 includes a top surface 231A and boundary surfaces 231B and 231C. The top surface 231A of the heater placement part 231 has a shape corresponding to the shape of the carbon heater 240. The boundary surfaces 231B and 231C substantially connect the reflector 230 to the top surface 231A of the heater placement part 231. The boundary surfaces 231B and 231O are inclined a certain angle from the reflector 230 and the top surface 231A. As a result, the heater placement parts 231 may substantially have a trapezoidal vertical cross section and a horizontal cross section with a size varied according to distances from the reflector 230.

The boundary surface 231B, which is disposed the inside of the heater placement part 231, has a completely U shaped cross section. Thus, the minimum distances between the boundary surface 231B and the outer surface of the carbon heater 240 substantially having a U shape are the same. The boundary surface 231C, which is disposed the outside of the heater placement part 231, has a rectangular horizontal cross section with round corners.

A portion of the reflector 230 surrounded by the boundary surface 231B (also, referred to as an inner boundary surface) forms a stepped portion with the rest of the reflector 230. The portion of the reflector 230 surrounded by the inner boundary surface 231B is disposed between the rest of the reflector 230 and the top surface 231A.

The carbon heaters 240 are disposed within the heater placement parts 231, respectively. The number of the heater placement parts 231 is determined according to the number of the carbon heaters 240. The heater placement parts 231 are elongated along the longitudinal direction of the reflector 230, and are spaced a certain distance from each other along the lateral direction thereof.

Two heater through opening parts 232 (refer to FIGS. 6 and 7) are disposed in a surface of the heater placement part 231. The heater through opening part 232 is formed by partially cutting the heater placement part 231. For example, the heater through opening part 232 may have a diameter greater than that of a tube 241 to be described later. Accordingly, interference between the tube 241 and the heater through opening part 232 can be minimized.

A barrier part 233 is disposed at the rear end of the reflector 230 near the heater through opening parts 232 of the heater placement parts 231. The barrier part 233 extends a certain distance rearward from the rear end of the reflector 230. The barrier part 233 is substantially disposed between the top surface of the first cavity 210 and the carbon heater 240. The barrier part 233 prevents heat transfer from the first cooking chamber 211 to the carbon heater 240 through the first cavity 210.

The bottom edge of the reflector 230 is fixed to the top surface of the first cavity 210 to correspond to the edge of the communication opening 213. Substantially, the bottom edge of the reflector 230 is fixed to a heater base 235 to be described later by a coupling member (not shown). A grate 260 to be described later is fixed to the central bottom of the reflector 230 between the heater placement parts 231.

The heater base 235 is disposed between the first cavity 210 and the reflector 230. The heater base 235 is fixed to the top surface of the first cavity 210. For example, the heater base 235 may be welded to the top surface of the first cavity 210. The bottom edge of the reflector 230 is fixed to the heater base 235 fixed to the top surface of the first cavity 210.

Referring to FIGS. 3 and 6, the heater base 235 includes a first fixing part 236, a connecting part 237, and a second fixing part 238. The first fixing part 236 of the heater base 235 is fixed to the top surface of the first cavity 210 near the communication opening 213. The connecting part 237 of the heater base 235 connects the first and second fixing parts 236 and 238 to each other. The reflector 230 is fixed to the second fixing part 238 of the heater base 235.

In detail, the first fixing part 236 of the heater base 235 is fixed to the top surface of the first cavity 210 near the communication opening 213. The first fixing part 236 of the heater base 235 may have a frame form with an inner edge adjacent to the communication opening 213.

The connecting part 237 of the heater base 235 extends upward from an outer edge of the first fixing part 236 of the heater base 235. For example, the connecting part 237 of the heater base 235 may be inclined a certain angle from the outer edge of the first fixing part 236 in a direction away from the communication opening 213. Alternatively, the connecting part 237 of the heater base 235 may be perpendicular to the first fixing part 236 of the heater base 235.

The connecting part 237 connects the first and second fixing parts 236 and 238 to each other such that the second fixing part 238 can be elastically deformed from the first fixing part 236. Accordingly, the second fixing part 238 absorbs external force applied to the reflector 230 so as to protect the carbon heaters 240.

The second fixing part 238 horizontally extends from an outer end of the connecting part 237. The second fixing part 238 extends from the outer end of the connecting part 237 in the direction away from the communication opening 213. As a result, the second fixing part 238 is substantially spaced upward from the top surface of the first cavity 210. The coupling member passing through the edge of the reflector 230 is coupled to the second fixing part 238.

The second fixing part 238 is disposed over the top surface of the first cavity 210 out of the communication opening 213. Thus, the coupling member passing through the edge of the reflector 230 and coupling to the second fixing part 238, that is, a coupling member for fixing the reflector 230 to the second fixing part 238 can be prevented from being exposed to the inside of the first cooking chamber 211.

The carbon heaters 240 are disposed over the communication opening 213. The carbon heaters 240 generate radiant energy in the form of light and heat for cooking food in the first cooking chamber 211. The carbon heaters 240 are disposed within the reflector 230, substantially, within the heater placement parts 231. The carbon heater 240 as a whole is elongated along the longitudinal direction of the reflector 230. In other words, the carbon heaters 240 are elongated along the long side of the heater placement parts 231. Referring to FIG. 4, the carbon heater 240 includes the tube 241, a filament 243, a plurality of insulators 245, a plurality of rods 247, and a plurality of terminals 249.

For example, the tube 241 may be a U-shaped quartz tube. The tube 241 is filled with inert gas, and sealing parts 242 are disposed on both ends of the tube 241 to seal the tube 241. The sealing parts 242 are formed by compressing both the ends of the tube 241.

The filament 243 is disposed within the tube 241. The filament 243 substantially generates radiant energy, i.e., light and heat. Both the ends of the filament 243 are spaced a preset distance from the sealing parts 242. For example, the filament 243 may be formed by weaving a plurality of fibers including carbon as a main component.

The insulators 245 are fixed by the sealing parts 242 formed by compressing the ends of the tube 241. The insulators 245 insulate the inside and outside of the tube 241 from each other.

The rods 247 are connected to both the ends of the filament 243. The rods 247 support the filament 243.

The terminals 249 are connected to the filament 243 through the rods 247. Wires (not shown) are connected to the terminals 249, and supply electric current to the filament 243 through the terminals 249.

The carbon heater 240 substantially includes a heating part 240A and both end parts 240B. The filament 243 is disposed in the heating part 240A. Thus, the heating part 240A is substantially a region where the filament 243 generates light and heat. The end parts 240B may be defined as portions of the carbon heater 240 out of the filament 243, that is, as the rest of the carbon heater 240 except for the heating part 240A, or as portions including the sealing parts 242, the insulators 245, the rods 247, and the terminals 249. Thus, the end parts 240B are out of the portion where the filament 243 generates light and heat. The end parts 240B include the sealing parts 242.

The heating part 240A has an open curve shape including a curve section and a straight line section, e.g., an U-shaped curve as a whole. Thus, as described above, the inner boundary surface 231B of the heater placement part 231 has a U-shaped horizontal cross section. Accordingly, the minimum distances between the inner boundary surface 231B and the heating part 240A are substantially the same. Thus, radiant energy generated from the heating part 240A is reflected at the same angle by the reflector 230. That is, radiant energy generated from the carbon heater 240 is transferred into the first cooking chamber 211 according to a design requirement. The end parts 240B extend in parallel to each other in the same direction from an end of the heating part 240A. The straight line section of the heating part 240A is elongated along the longitudinal direction of the reflector 230.

The carbon heaters 240 are spaced a certain distance from each other on the top surface of the first cavity 210 along the lateral direction of the first cavity 210 such that the end parts 240B are oriented to the rear surface of the first cavity 210.

The heating part 240A and a portion of the end parts 240B are disposed within the reflector 230, substantially within the heater placement part 231. The sealing parts 242 and the rest of the end parts 240B except for the portion disposed within the heater placement parts 231 extend out of the heater placement part 231 through the heater through opening parts 232. In other words, the heating part 240A and a portion of the end parts 240B are covered by the reflector 230, and the sealing parts 242 and the rest of the end parts 240B except for the portion disposed within the reflector 230 are exposed to the outside.

The heating part 240A is disposed over the communication opening 213, and the end parts 240B are disposed over the first cavity 210. In other words, an image of the heating part 240A is vertically projected onto the bottom surface of the first cooking chamber 211 through the communication opening 213. An image of the end parts 240B extending out of the reflector 230 is vertically projected onto the top surface of the first cavity 210, particularly, onto the barrier part 233.

Referring again to FIG. 3, first heater supporting holders 251 and second heater supporting holders 257 support the carbon heaters 240. The first heater supporting holders 251 support the end parts 240B. The second heater supporting holders 257 support the heating parts 240A.

In more detail, referring to FIGS. 6 and 7, the first heater supporting holders 251 elastically support the end parts 240B. To this end, the first heater supporting holder 251 includes a first fixing part 252, a first placement part 255, and a cover part 256.

The first fixing part 252 is fixed to a surface of the heater placement part 231 provided with the heater through opening parts 232, the top surface of the reflector 230 near the heater placement part 231, and another surface of the heater placement part 231. The first fixing part 252 includes heater through hole parts 253 corresponding to the heater through opening parts 232. Like the heater through opening parts 232, the heater through hole parts 253 have a shape and a size such that the edges thereof are spaced apart from the outer circumferential surface of the tube 241. For example, the heater through hole part 253 may have a circular shape with a diameter greater than the diameter of the tube 241.

Buffer members 254 are provided to the edge of the heater through hole part 253. The buffer members 254 protect the tube 241 from an end of the first fixing part 252 corresponding to the edge of the heater through hole part 253. Substantially, the buffer members 254 absorb external force during an assembling or installing process, which causes a movement between the tube 241 and the heater through opening 232 or the heater through hole part 253. In addition, the buffer members 254 substantially prevent the tube 241 from contacting the heater through opening part 232 and the heater through hole part 253. Thus, the buffer members 254 may be referred to as contact preventing members.

To this end, the buffer members 254 are bent from the edge of the heater through hole part 253 to form a certain angle with the first fixing part 252 such that the buffer members 254 can be elastically deformed formed the first fixing part 252. The top of the buffer members 254 extending from the heater through hole part 253 is closer to the outer circumferential surface of the tube 241 than the base thereof is. In addition, the top of the buffer members 254 is smaller in width than the base thereof. Accordingly, a contact area between the tube 241 and the buffer members 254 is smaller than a contact area between the tube 241 and both the heater through opening part 232 and the heater through hole part 253.

An insulating material I is disposed between the reflector 230 and the first fixing part 252. The Insulating material I prevents radiant energy from leaking from the carbon heater 240 to the outside of the reflector 230 through the heater through opening parts 232 and the heater through hole parts

253. The insulating material I is substantially fixed by fixing the first fixing part 252 to the surface of the heater placement part 231.

The insulating material I includes a first insulating material I1 and a second insulating material I2. The first insulating material I1 may be a mesh formed of a metal such as brass. The second insulating material I2 may be a sheet formed of, e.g., ceramic glass. A surface of the first insulating material I1 tightly contacts a surface of the reflector 230, substantially, a surface of the heater placement part 231. A surface of the second insulating material I2 tightly contacts a surface of the first heater supporting holder 251. The other surfaces of the first and second insulating materials I1 and I2 tightly contact each other. In other words, the first insulating material I1 is relatively adjacent to the reflector 230, and the second insulating material I2 is relatively adjacent to the first heater supporting holder 251. Accordingly, the ceramic glass constituting the second insulating material I2 is prevented from being exposed to the inside of the reflector 230 and the inside of the first cooking chamber 211 through the heater through opening parts 232.

The first placement part 255 of the first heater supporting holder 251 is bent at a preset angle from the lower end of the first fixing part 252. The first placement part 255 extending from the first fixing part 252 can be vertically and elastically deformed. A portion of the outer circumferential surfaces of the end parts 240B, particularly, the lower portion thereof is placed on the first placement part 255. Thus, the first placement part 255 may have a shape corresponding to the lower portion of the outer circumferential surfaces of the end parts 240B.

The cover part 256 of the first heater supporting holder 251 prevents an accidental movement of the end parts 240B placed on the first placement part 255 of the first heater supporting holder 251. To this end, the cover part 256 substantially has a shape corresponding to the rest of the outer circumferential surfaces of the end parts 240B except for the lower portion placed on the first placement part 255, that is, a shape corresponding to the upper portion of the outer circumferential surfaces of the end parts 240B. When the lower portion of the outer circumferential surfaces of the end parts 240B is placed on the first placement part 255, the cover part 256 is coupled to the first placement part 255.

Referring again to FIG. 3, the second heater supporting holders 257 support a portion of the heating part 240A, particularly, boundary surfaces between the straight line section and the curve section of the heating part 240A. The second heater supporting holder 257 includes a second supporting part 258 and a second fixing part 259.

The second supporting part 258 has an open ring shape as a whole. The second supporting part 258 may have a diameter greater than that of the tube 241. Thus, the inner surface of the second supporting part 258 supports a portion of the outer circumferential surface of the heating part 240A.

The second fixing part 259 extends from an end of the second supporting part 258. The second fixing part 259 is fixed to the inner surface of the reflector 230, particularly, to the inner surface of the heater placement part 231.

The grate 260 is disposed over the communication opening 213. Substantially, the grate 260 is disposed over the heater base 235. The grate 260 transfers radiant energy from the carbon heaters 240 into the first cooking chamber 211, and protects the carbon heaters 240 from an external foreign substance.

The grate 260 may have a flat polyhedral shape with an open top surface and a bottom surface corresponding to a horizontal cross section of the communication opening 213 and/or the heater base 235. The bottom surface of the grate 260 may be smaller than the horizontal cross section of the communication opening 213 and/or the heater base 235. Thus, interference between the grate 260 and the communication opening 213 and/or the heater base 235 can be prevented.

Referring to FIGS. 3 and 5, the grate 260 includes a forming part 261. The forming part 261 is formed by upwardly protruding a portion of the grate 260 from the rest of the grate 260. The forming part 261 prevents thermal strain of the grate 260 due to radiant energy from the carbon heaters 240.

The grate 260 includes a first reflector fixing part 263. The first reflector fixing part 263 is formed by upwardly protruding a portion of the grate 260 from the rest of the grate 260. More particularly, the first reflector fixing part 263 is formed by upwardly protruding a portion of the forming part 261 from the rest of the forming part 261. The first reflector fixing part 263 is fixed to the central bottom of the reflector 230. Thus, a portion of the grate 260 is substantially protruded to a two-level structure, thereby forming the forming part 261 and the first reflector fixing part 263.

A second reflector fixing part 265 is disposed on the edge top of the grate 260. The second reflector fixing part 265 extends in an approximately horizontal direction from the edge top of the grate 260. The second reflector fixing part 265 is fixed to the bottom edge of the reflector 230. In this state, the edge of the reflector 230 is fixed to the second fixing part 238 through the coupling member. Accordingly, the reflector 230, the heater base 235, and the grate 260 are tightly contact one another.

The grate 260 includes communication holes 267. The communication holes 267 substantially pass through the bottom surface of the grate 260. The communication holes 267 are entirely formed in the first reflector fixing part 263 and the bottom surface of the grate 260.

The communication holes 267 are elongated along an approximately lateral direction of the grate 260. In other words, the communication holes 267 are perpendicular to the straight line section of the heating part 240A. The straight line section of the heating part 240A is substantially elongated along the longitudinal direction of the grate 260. Thus, the straight line section of the heating part 240A alternately crosses any one of the communication holes 267 constituting any one column, and a bottom portion of the grate 260 between the column and another column adjacent to the first column.

The communication holes 267 are arrayed in a plurality of rows along the lateral direction of the grate 260. The rows of the communication holes 267 are spaced apart from one another by a certain distance along the longitudinal direction of the grate 260. Both ends of each of the communication holes 267 constituting any one (refer to A or B of FIG. 5) of the rows do not overlap both ends of each of the communication holes 267 constituting another row (refer to B or C of FIG. 5) adjacent to the first row, along the straight line section of the heating part 240A.

Thus, an imaginary line (a line X or Y of FIG. 5) extending along the straight line section of the heating part 240A crosses at least one of the communication holes 267. In more detail, the line X alternately crosses any one of the communication holes 267 constituting any one row (refer to A), and a bottom portion of the grate 260 between the row and another row (refer to B) adjacent to the first row. The line Y alternately crosses: any one of the communication holes 267 constituting any one row (refer to A); a bottom portion of the grate 260 between the row and another row (refer to B) adjacent to the first row (refer to A); a bottom portion of the grate 260 between the communication holes 267 constituting the second row (refer to B); and a bottom portion of the grate 260 between the second row (refer to B) and another row (refer to C) adjacent to the second row (refer to B). That is, substantially, the line Y extends along the straight line section of the heating part 240A between ends of the communication holes 267 constituting any one row (refer to B), and crosses two of the communication holes 267 constituting other rows (refer to A and C) adjacent to the first row (refer to B). The straight line section of the heating part 240A is disposed on the line X and/or Y according to relative positions to the grate 260.

According to the above shapes and positions of the communication holes 267, bottom portions of the grate 260 disposed between the communication holes 267 constituting neighboring rows (refer to A and B, or B and C), or bottom portions of the grate 260 disposed between the communication holes 267 constituting a single row can be prevented from blocking radiant energy from the carbon heaters 240 into the first cooking chamber 211, or the blocking of the radiant energy can be minimized. That is, the above shapes and positions of the communication holes 267 prevent the bottom of the grate 260 out of the communication holes 267 from blocking radiant energy from the carbon heaters 240 into the first cooking chamber 211.

The reflector 230, the carbon heaters 240, and the grate 260 are fixed to one another so as to form a single unit that is fixed to the first cavity 210. That is, when the carbon heaters 240 are fixed to the reflector 230 by the first and second heater supporting holders 251 and 257, the grate 260 is fixed to the reflector 230. Then, the carbon heaters 240 and the grate 260 are fixed to the first cavity 210, that is, the heater base 235, which will be described later.

Referring again to FIG. 3, an insulator cover 270 is disposed above the reflector 230. The insulator cover 270 fixes an insulating material (not shown) disposed between the insulator cover 270 and the reflector 230. To this end, the insulator cover 270 has an approximately polyhedral shape with an open bottom surface. The insulator cover 270 has a top surface equal to or greater than the reflector 230. The insulator cover 270 placed on the top edge of the reflector 230 is fixed to the heater base 235.

A latch placement part 271 is disposed in the front end of the insulator cover 270. The latch placement part 271 is formed by recessing the central portion of the front end of the insulator cover 270. A latch hook assembly 291 to be described later is placed on the latch placement part 271.

A sheath heater 280 is disposed within the first cooking chamber 211. The sheath heater 280 is bent a plurality of times to form a meander shape as a whole, and both ends thereof pass through the rear surface of the first cavity 210. The sheath heater 280 generates radiant energy in the form of heat for cooking food in the first cooking chamber 211.

A locking device is disposed on the first oven part 200. When the first cooking chamber 211 is closed, the locking device prevents the first door 220 from opening the first cooking chamber 211. For example, the locking device prevents the first door 220 from being opened during a thermal decomposition cleaning process of burning a foreign substance stuck to the inner surface of the first cooking chamber 211. The locking device includes: the latch hook assembly 291 for hooking the first door 220; a latch motor 293 for generating driving force to operate the latch hook assembly 291; and a latch bar 295 for transmitting the driving force from the latch motor 293 to the latch hook assembly 291.

Referring again to FIGS. 1 and 2, the second oven part 300 includes a second cavity 310 including a second cooking chamber 311, and a second oven door 320 selectively opening and closing the second cooking chamber 311.

Further, the second oven part 300 includes a heating source for cooking food in the second cooking chamber 311. The second oven part 300 includes a broil heater 330, a bake heater 340, and a convection device 350. The broil heater 330 is disposed in the upper portion of the second cooking chamber 311. The bake heater 340 is disposed in the lower portion of the second cooking chamber 311. The convection device 350 is disposed on the rear surface of the second cooking chamber 311. Since the broil heater 330, the bake heater 340, and the convection device 350 are well known in the art, a description thereof will be omitted.

The second oven part 300 includes a locking device (not shown). When the second cooking chamber 311 is closed, the locking device prevents the second door 320 from opening the second cooking chamber 311. The locking device has the same configuration as that of the locking device of the first oven part 200.

Referring to FIG. 2, a discharge duct part 500 is disposed within the main body 1. Gas generated while cooking food in the first and second oven parts 200 and 300 is discharged to the outside by the discharge duct part 500.

Hereinafter, an operation of an electric oven according to an embodiment will now be described in detail.

First, a process of disassembling an electric oven according to an embodiment will now be described in detail with reference to the accompanying drawings.

FIGS. 8 to 11 are perspective views illustrating a process of disassembling an electric oven according to an embodiment.

Figure 8:
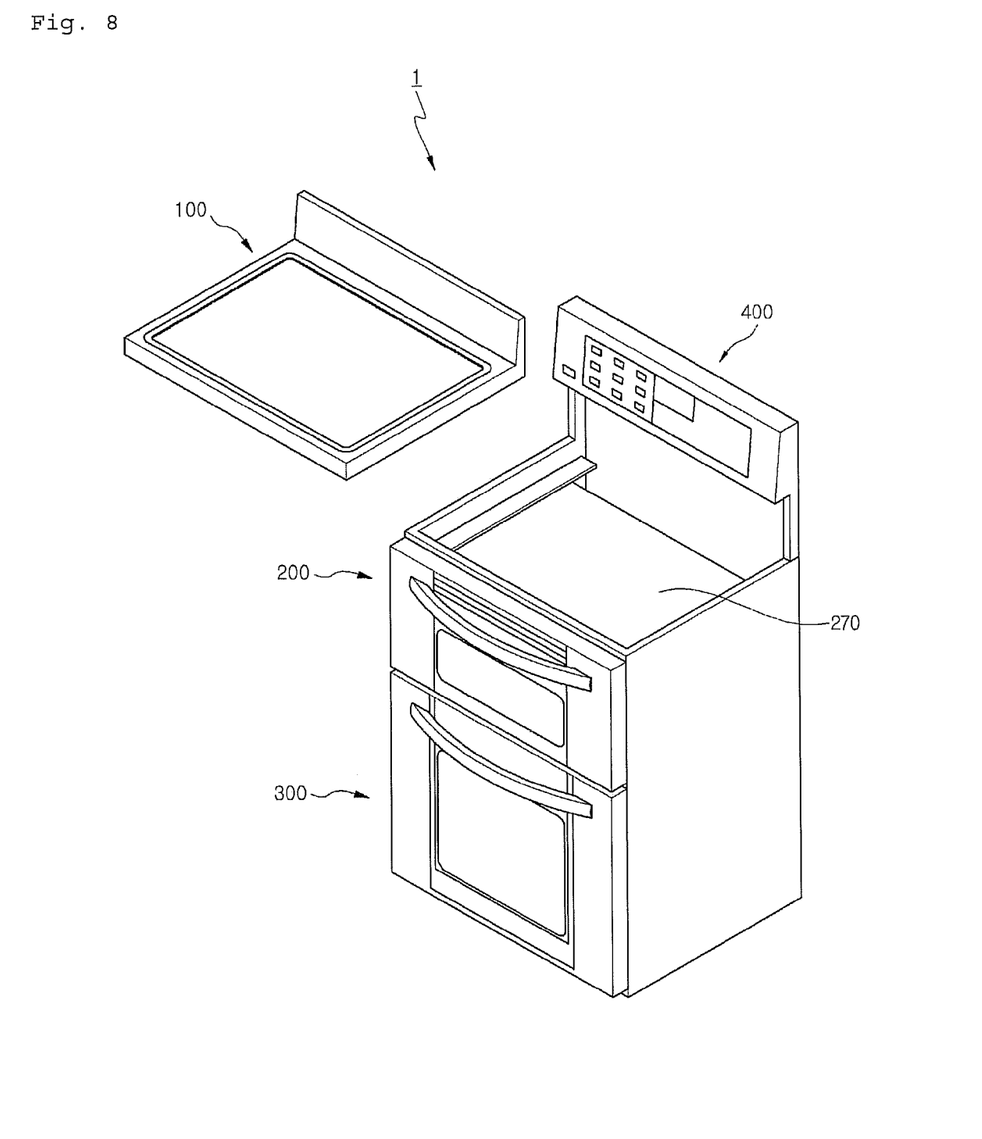
FIGS. 8 to 11 are perspective views illustrating a process of disassembling an electric oven according to an embodiment.

When the first oven part 200, particularly, the carbon heaters 240 are repaired or replaced, the carbon heaters 240 are removed from the first oven part 200. To this end, the cooktop 100 is removed from the main body 1 to open the upper portion of the main body 1, so that the carbon heaters 240 can be removed through the opened upper portion of the main body 1.

In more detail, referring to FIG. 8, the cooktop 100 is removed from the main body 1. For example, the cooktop 100 may be removed from the main body 1 by removing a coupling member (not shown) fixing the cooktop 100 to the main body 1. Then, the top of the main body 1 is opened, and the upper portion of the first oven part 200 is exposed to the outside through the top of the main body 1.

Figure 9:
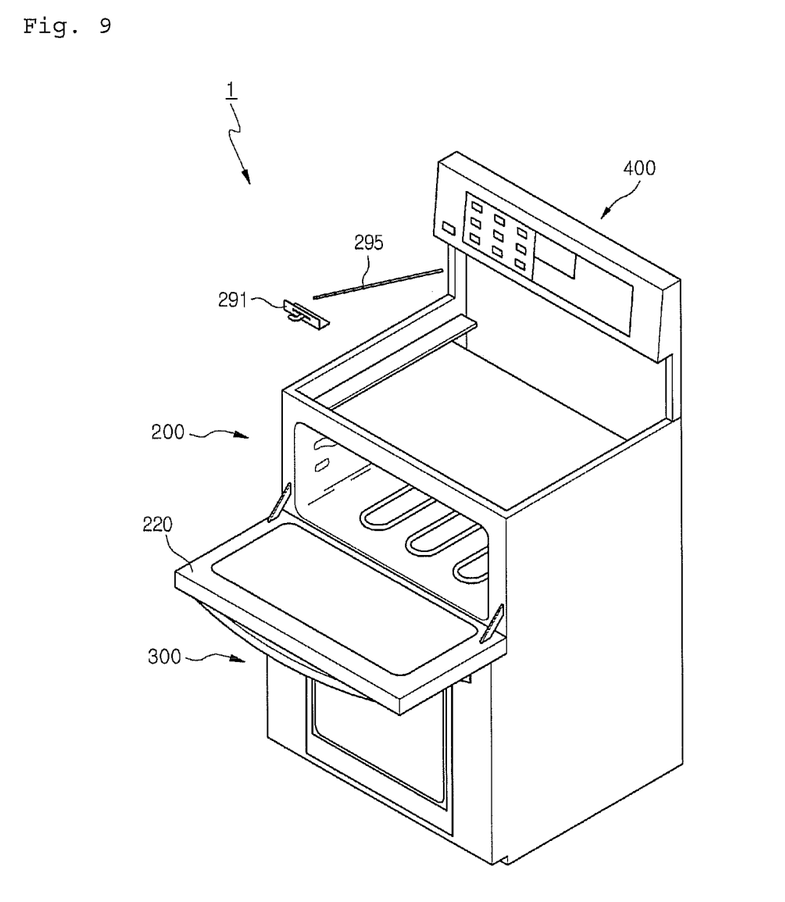

Referring to FIG. 9, the first door 220 for opening and closing the first cooking chamber 211 is opened, and the latch bar 295 and the latch hook assembly 291 constituting the locking device are removed from the first oven part 200. First, the latch bar 295 is removed from the latch motor 293 and the latch hook assembly 291. The latch hook assembly 291 is removed from the insulator cover 270 by removing a coupling member (not shown) for fixing the latch hook assembly 291 to the first oven part 200, substantially, to the insulator cover 270. Then, the latch hook assembly 291 and the latch bar 295 are taken out through the opened top of the main body 1.

Figure 10:
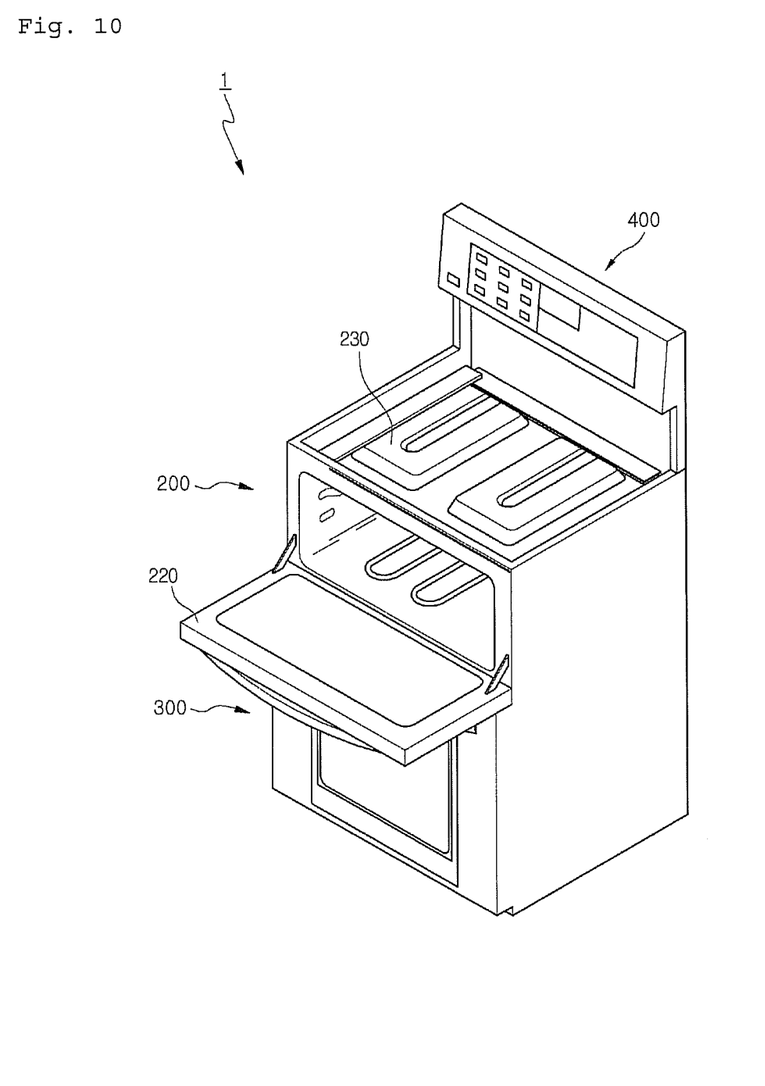

After that, referring to FIG. 10, the insulator cover 270 is removed from the first cavity 210. Like the cooktop 100 and the latch hook assembly 291, the insulator cover 270 is removed from the first cavity 210 by removing a coupling member (not shown). Then, the insulator cover 270 is taken out through the opened top of the main body 1. Then, the insulating material (not shown) disposed between the insulator cover 270 and the reflector 230 is removed.

Figure 11:
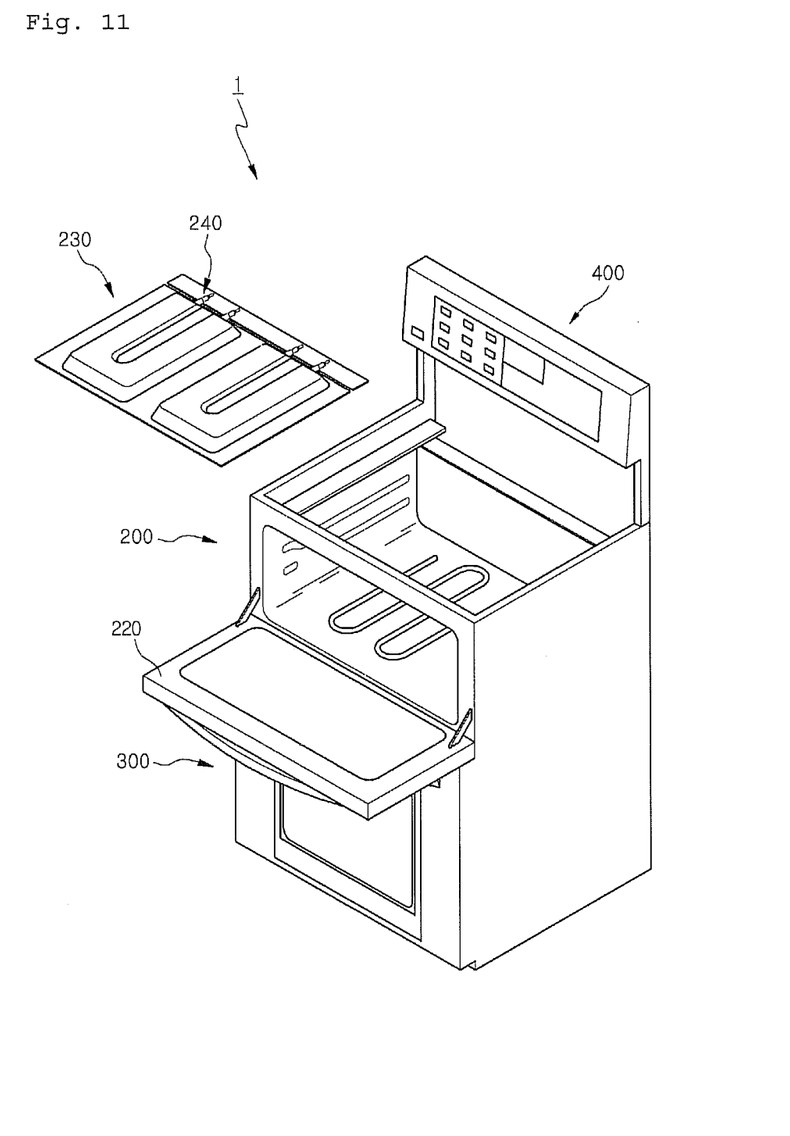

After the insulator cover 270 and the insulating material are removed, referring to FIG. 11, the reflector 230 is removed from the first cavity 210. The reflector 230 is removed from the first cavity 210 by removing the coupling member from the heater base 235. At this point, the carbon heaters 240 and the grate 260 fixed to the reflector 230 are also removed from the first cavity 210. After that, the grate 260 is removed from the reflector 230, and the carbon heaters 240 are then removed from the reflector 230.

As described above, while the carbon heaters 240 are removed from the first cavity 210, the carbon heaters 240 are substantially fixed to the reflector 230, thus preventing damage to the carbon heaters 240 due to a process of removing only the carbon heaters 240 from the first cavity 210. After the carbon heaters 240 are removed and repaired or replaced, the carbon heaters 240 are fixed to the first oven part 200 in a reverse order to the above order.

Hereinafter, a cooking operation of an electric oven according to an embodiment will now be described in detail.

First, food is put in the first cooking chamber 211, and the carbon heaters 240 and/or the sheath heater 280 are selected and operated by a user. Accordingly, radiant energy is transferred from the carbon heaters 240 and/or the sheath heater 280 into the first cooking chamber 211, and the food is cooked in the first cooking chamber 211.

In more detail, electric current is supplied to the filament 243 through the wires. The filament 243 generates light and heat through electrical resistance. The light and heat generated from the filament 243 are supplied into the first cooking chamber 211 through the communication opening 213 and the communication holes 267. At this point, the light and heat generated from the filament 243 are reflected into the first cooking chamber 230 by the reflector 230. The light and heat supplied into the first cooking chamber 211 heats the food, whereby the food is cooked in the first cooking chamber 211.

As described above, since the straight line section of the heating part 240A alternately crosses any one of the communication holes 267 constituting any one column, and a bottom portion of the grate 260 between the column and another column adjacent to the first column, the amount of light and heat blocked by the grate 260 can be minimized. That is, the food in the first cooking chamber 211 can be more efficiently cooked by the carbon heaters 240.

In addition, as described above, the grate 260 is fixed to the reflector 230, and includes the forming part 261, thus preventing thermal deformation or sag of the grate 260 due to the radiant energy from the carbon heaters 240.

Only a portion of the carbon heaters 240 is disposed within the reflector 230, and the rest thereof is disposed out of the reflector 230. That is, the heating part 240A and a portion of the end parts 240B are disposed within the reflector 230, and the sealing parts 242 and the rest of the end parts 240B are disposed out of the reflector 230. Thus, the sealing parts 242 and at least one portion of the end parts 240B can be maximally protected from light and heat generated from the carbon heaters 240. A portion of the end parts 240B out of the reflector 230 dissipates heat within the main body 1.

The barrier part 233 prevents inner heat of the first cooking chamber 211 from being transferred to the end parts 240B through the first cavity 210. Thus, thermal damage to the end parts 240B can be minimized.

According to an embodiment, a heater can be protected, and be conveniently installed and removed.

According to the above embodiments, the following effects can be attained.

Carbon heaters, a reflector, and a grate are assembled into a single heating unit that is fixed to a cavity. Thus, damage to the carbon heaters during installing and removing processes can be minimized.

In addition, the heating unit can be installed within the cavity or be removed therefrom through the top of a main body of an electric oven provided with a cooktop. Thus, the heating unit, that is, the carbon heaters can be installed and removed more conveniently.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric oven comprising:
   a main body;
   a cooktop disposed in an upper portion of the main body to heat an object; and
   an oven part disposed within the main body under the cooktop, and comprising a cavity comprising a cooking chamber, a door selectively opening and closing the cooking chamber, and a first heating unit and a second heating unit, which supply radiant energy into the cooking chamber,
   wherein before the cooktop is installed, or after the cooktop is removed, a top of the main body is opened, and the first heating unit is installed in or removed from the cavity through the opened top of the main body, and
   the second heating unit is installed in or removed from the cooking chamber through an open front of the cooking chamber.

2. The electric oven according to claim 1, wherein the first heating unit comprises at least one carbon heater.

3. The electric oven according to claim 1, wherein the first heating unit comprises:
   a carbon heater generating the radiant energy that is supplied into the cooking chamber; and
   a reflector to which the carbon heater is fixed, the reflector reflecting the radiant energy from the carbon heater into the cooking chamber.

4. The electric oven according to claim 3, wherein the carbon heater fixed to the reflector is installed in the cavity through the top of the main body, or is removed from the reflector removed from the cavity through the top of the main body.

5. The electric oven according to claim 1, wherein the first heating unit comprises:
   a carbon heater generating the radiant energy that is supplied into the cooking chamber;
   a reflector to which the carbon heater is fixed, the reflector reflecting the radiant energy from the carbon heater into the cooking chamber; and
   a grate disposed between the carbon heater and a surface of the cooking chamber when the first heating unit is installed in the cavity, the grate comprising communication holes for transferring the radiant energy from the carbon heater into the cooking chamber.

6. The electric oven according to claim 5, wherein the carbon heater and the grate, fixed to the reflector, are installed in the cavity through the top of the main body, or are removed from the reflector removed from the cavity through the top of the main body.

7. The electric oven according to claim 1, wherein the first heating unit comprises at least one sheath heater.

8. The electric oven according to claim 1, further comprising an insulator cover that is installed in the cavity, and covers an insulating material disposed between a bottom surface thereof and a top surface of the reflector.

9. The electric oven according to claim 8, wherein before the cooktop is installed, or after the cooktop is removed, a top of the main body is opened, and the insulator cover is installed in or removed from the cavity through the opened top of the main body.

10. The electric oven according to claim 8, further comprising:
a latch hook assembly that selectively hooks the door to prevent the door from being accidentally rotated in an opening direction of the cooking chamber when the cooking chamber is closed, and that is disposed on a top surface of the insulator cover;
a latch motor that provides driving force such that the latch hook assembly selectively hooks the door; and
a latch bar transmitting the driving force from the latch motor to the latch hook assembly,
wherein the latch hook assembly is installed on the top surface of the insulator cover through the top of the main body after the insulator cover is installed in the cavity, or the latch hook assembly is removed from the top surface of the insulator cover before the insulator cover is removed from the cavity.

11. An electric oven comprising:
a cavity comprising a cooking chamber and a communication opening;
a door that selectively opens and closes the cavity;
a cover member that covers the communication opening; and
a heater mounted in the cover member and supplying radiant energy into the cooking chamber through the communication opening,
wherein the heater is fixed to or removed from the cavity in a state which the heater is fixed to the cover member.

12. The electric oven according to claim 11, wherein the cover member comprises a reflector that reflects the radiant energy from the heater into the cooking chamber.

13. The electric oven according to claim 11, wherein the heater comprises a hollow tube and a carbon filament disposed in the tube.

14. The electric oven according to claim 11, further comprising a grate disposed between one surface of the cooking chamber and the heater and provided with a communication hole that transfer the radiant energy to an inside of the cooking chamber, wherein the grate is fixed to the cavity in a state which the grate is fixed to the cover member.

15. The electric oven according to claim 14, wherein the grate is fixed to the cover member after the heater is fixed to the cover member.

16. A method of servicing an electric oven comprising a main body, a cooktop disposed in an upper portion of the main body to heat an object, a cavity disposed within the main body under the cooktop, and a heating unit fixed to the cavity, the method comprising:
removing the cooktop from the main body; and
removing the heating unit from the cavity through an opened top of the main body, wherein the top of the main body is opened by removing the cooktop.

17. The method according to claim 16, wherein the heating unit comprises a carbon heater that generates radiant energy, and a reflector to which the carbon heater is fixed,
wherein the method further comprises removing the carbon heater from the reflector after the removing of the heating unit from the cavity.

18. The method according to claim 12, wherein the heating unit comprises a carbon heater that generates radiant energy, a reflector to which the carbon heater is fixed, and a grate fixed to the reflector and comprising communication holes for transferring the radiant energy from the carbon heater,
wherein the method further comprises:
removing the grate from the reflector after the removing of the heating unit from the cavity; and
removing the carbon heater from the reflector after the removing the grate from the reflector.

19. The method according to claim 16, wherein an insulating material is disposed at least on a top surface of the cavity,
wherein the method further comprises removing the insulating material through the top of the main body before the removing of the heating unit from the cavity through the top of the main body.

20. The method according to claim 16, wherein an insulating material is disposed at least on a top surface of the cavity, and
an insulator cover fixes the insulating material,
wherein the method further comprises removing the insulating material and the insulator cover through the top of the main body before the removing of the heating unit from the cavity through the top of the main body.

* * * * *